Patented Jan. 12, 1937

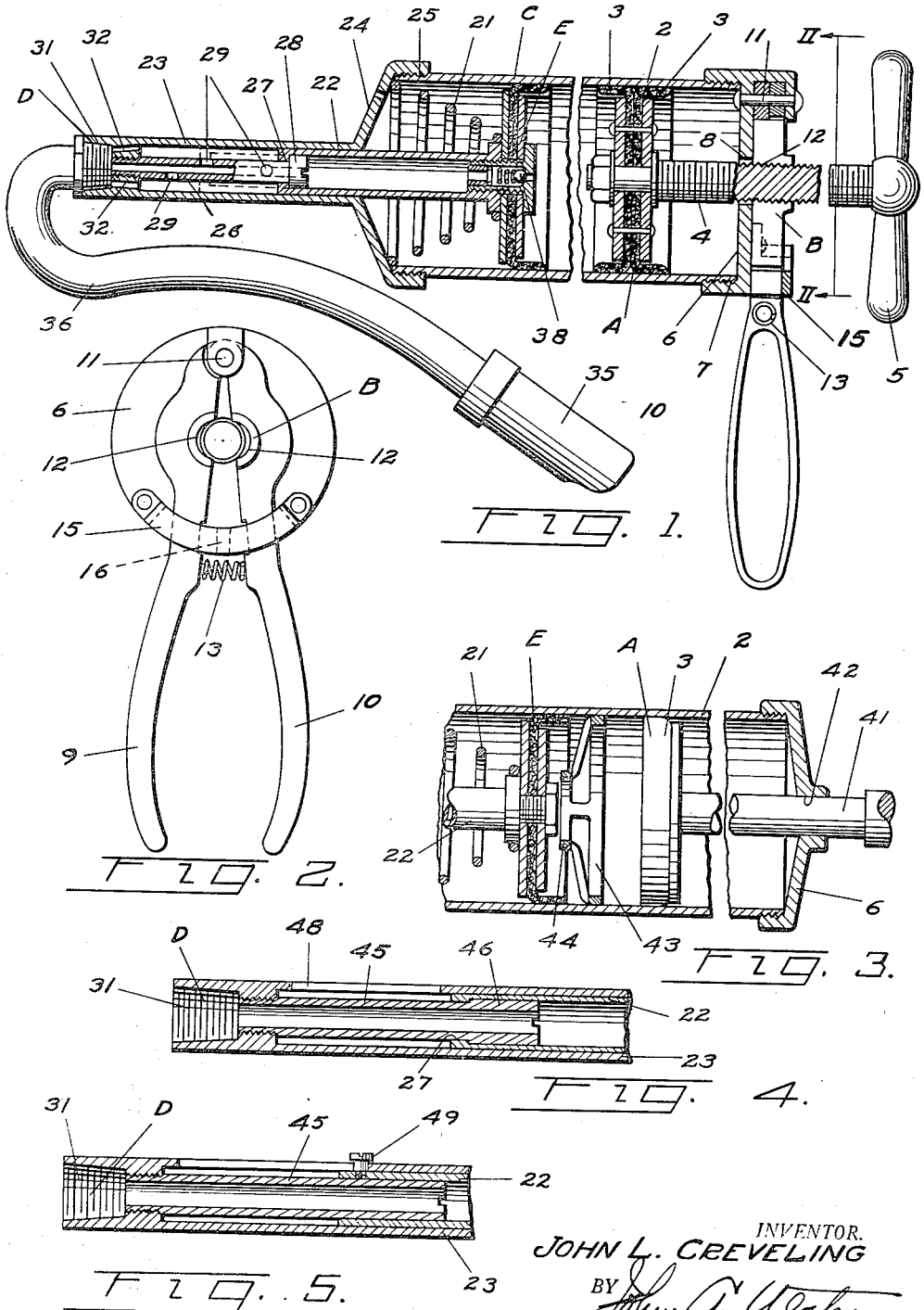

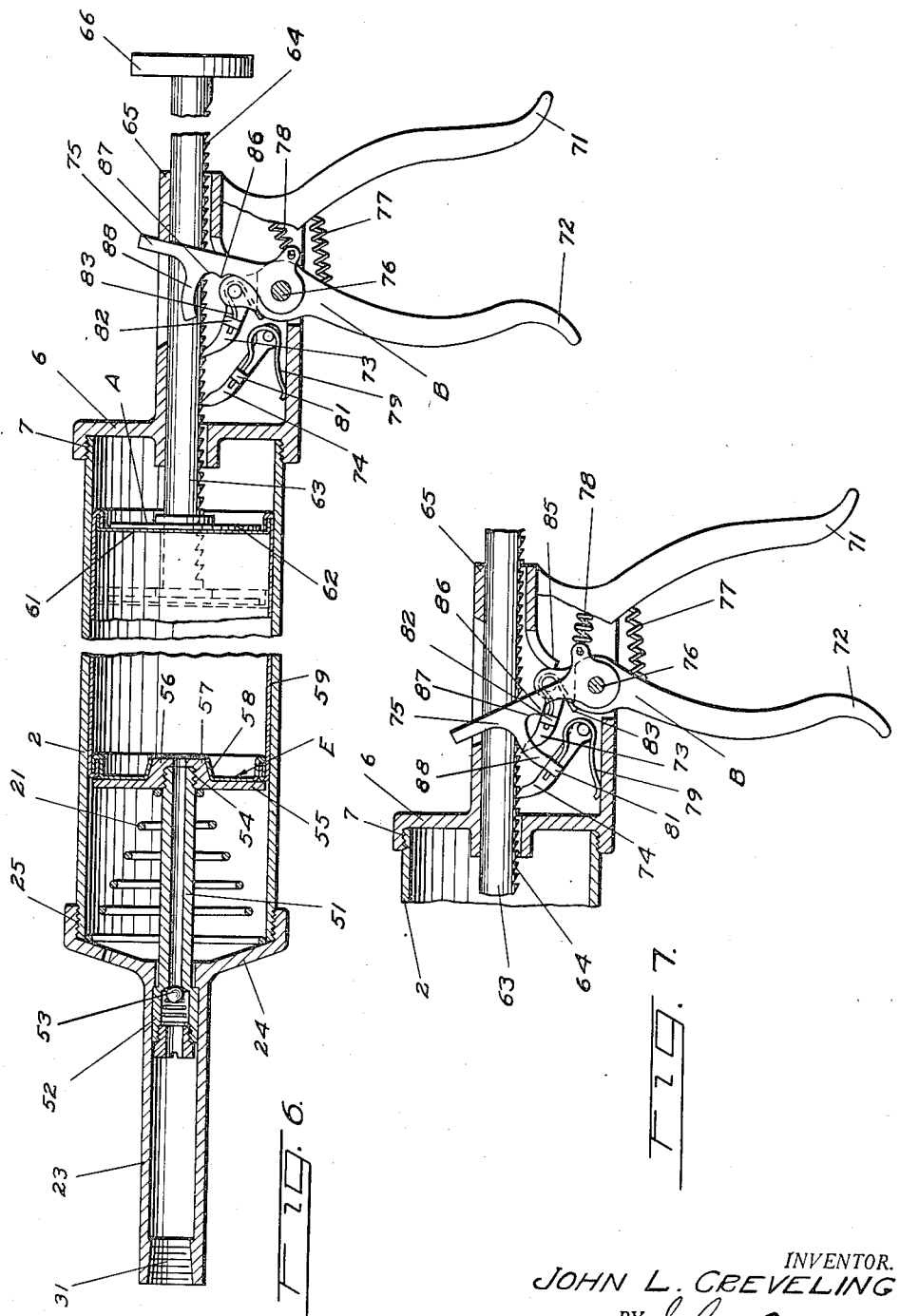

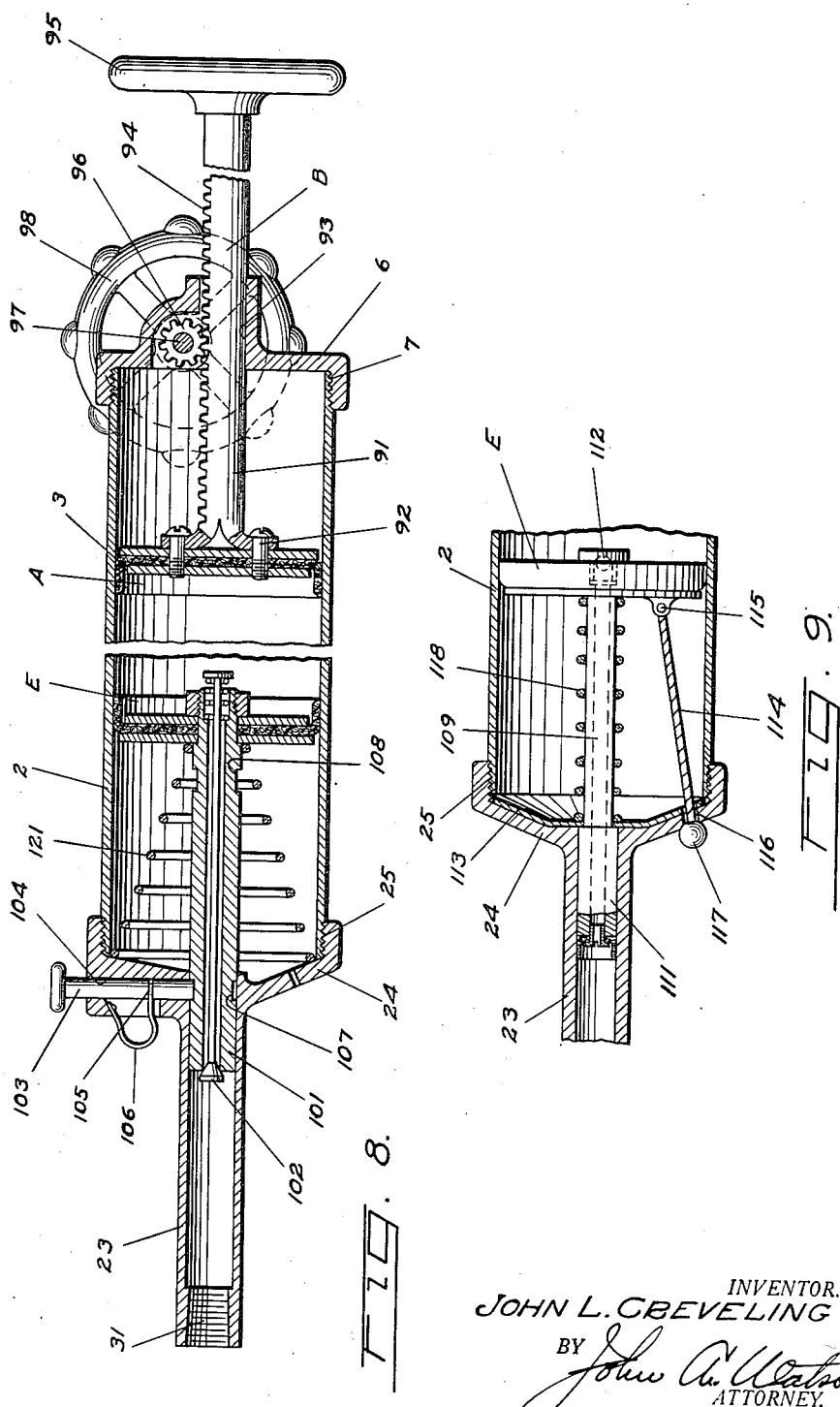

2,067,260

UNITED STATES PATENT OFFICE 2,067,260

LUBRICATING MEANS

John L. Creveling, near Tucson, Ariz., assignor to The Lubrication Corporation, South Bend, Ind., a corporation of Delaware Application July 22, 1932 Serial No. 623,939

13 Claims. (Cl. 221—47.3)

This invention relates to improvements in lubricating devices and, more particularly, double-stage lubricant feeder apparatus wherein lubricant under increased pressure is supplied upon increased resistance to discharge.

This application is a continuation, in part, of my co-pending application for patent on Lubricating means, Serial No. 717,149, filed May 31, 1924.

Prior to my present invention, lubricant feeder apparatus has been devised comprising a primary lubricant compressor having a discharge conduit and a secondary compressor connected to the discharge conduit and so arranged that lubricant discharged from the primary compressor under relatively low pressures may pass through the secondary compressor and be discharged therefrom into lubricant receiving fittings and the like, and wherein resistance encountered to the passing of lubricant into said fittings causes the lubricant to flow into and occupy the operating cylinder of the secondary compressor on the low pressure side, to cause the secondary compressor to function and discharge lubricant under high pressure to the fitting, to overcome the resistance encountered.

The apparatus contemplated the use of a well known type of hand gun having a screw fed piston as the primary compressor and a separate unit connectable therewith as the secondary compressor comprising an individual article of manufacture intended for quick attachment and detachment to and from the primary compressor. Inherent characteristics necessitate the use of a relatively small actuating piston in the secondary compressor due to the flow of relatively large quantities of lubricant from the primary compressor through a conduit to the secondary compressor and back again during the operation of the secondary compressor.

An object of my present invention is to provide an improved unitary double-stage lubricant feeder apparatus.

Another object is to provide a lubricant feeder device wherein the lubricant comprising the immediate source of supply is normally discharged by primary compressor function through a suitable discharge nozzle or coupler and wherein the lubricant may be shifted, en masse, upon increased resistance to lubricant discharge, to operate the secondary or high pressure compressor.

A further object is to provide, in a lubricant feeder apparatus as described, primary compressor operating mechanism for advancing the primary piston under force multiplying instrumentality, and for quickly retracting the piston so as to restore the secondary compressor actuating piston to its normal position, as after a high pressure stroke.

A still further object is to provide a lubricant feeder apparatus in which lubricant may be supplied thereto in cartridge form and wherein the cartridge may move bodily, during the transmission of operating force from the primary compressor to the secondary compressor.

Other objects, advantages and uses of the invention, will be apparent after reading the following description and claims and after consideration of the accompanying drawings forming a part of this specification, in which:

Fig. 1 is a sectional view of one form of my improved lubricant feeder apparatus;

Fig. 2 is a view along the line II—II of Fig. 1;

Fig. 3 is a fragmentary sectional view of another form of the apparatus;

Figs. 4 and 5 are fragmentary sectional views illustrating modifications of the secondary compressor structure;

Fig. 6 is a sectional view of another form of the apparatus incorporating a lubricant cartridge as a source of lubricant supply and a ratchet drive primary piston actuator;

Fig. 7 is a fragmentary view of the apparatus of Fig. 6 showing the ratchet drive mechanism set for return of the primary piston;

Fig. 8 is a sectional view of still another form of the lubricant feeder apparatus; and Fig. 9 is a fragmentary sectional view illustrating a modified form of secondary compressor construction.

In general, my improved double-stage lubricant feeder apparatus comprises a primary or low pressure compressor having a piston A, mechanism B for operating the piston, a secondary compressor operable under influence of lubricant pressure from the primary compressor, and a casing C within which the two compressors are confined, having a discharge orifice D. The casing C includes a barrel forming a common cylinder within which the piston A and the actuating piston E of the secondary compressor are mounted for reciprocation, and between which lubricant comprising the source of lubricant supply is confined.

In Figs. 1 and 2, I have shown one form of my improved lubricant feeder apparatus wherein the primary or low pressure piston A and the high pressure actuating piston E are mounted within a common barrel 2, forming an operating cylinder therefor. The piston A includes a pair of opposed cup leather sealing members 3, and is mounted by swivel connection upon the inner end of a screw 4. A handle 5 is transversely disposed upon the remote end of the screw, by means of which the screw may be rotated. A closure cap 6 is provided for the rearward end of the barrel 2 and detachably secured thereto by screw threads, as shown at 7. The cap has a central opening 8 through which the screw 4 may freely pass. A pair of handle members 9 and 10, each formed with screw threads 12 on their adjacent faces, is pivotally supported upon a common center pin 11 fixed to the outer face of the cap 6, so that when pivoted toward one another the threads 12 may engage with the screw 4 and cause the piston A to advance when the handle 5 is turned. The threads 12, as well as those upon the screw 4, are preferably of the V-type. A compression spring 13 is disposed between the members 9 and 10 to normally urge the members apart, and hence the threads 12 out of engagement with the screw 4. A guide member 15 is fixed to the cap 6 over the members 9 and 10 to limit movement of the members relative to one another and to provide resistance to thrust applied to the members, as during operation of the screw. A central stop member 16, formed on the guide 15, is provided to assure proper registration between the threads 12, the screw 4 and opening 8, and, further, through the medium of the handles 9 and 10, to retain the barrel 2 against rotation as the screw 4 is rotated.

The secondary compressor is located within the opposite end of the barrel 2 and comprises the actuating piston E facing the piston A and normally urged toward the piston A by a compression spring 21. The high pressure mechanism of the secondary compressor includes a cylinder 22 fixed to the piston E and extending forwardly along the axis thereof. The cylinder 22 is slidably disposed within a tubular elongated portion 23 of a cap 24. The cap 24 serves as a closure of the forward end of the barrel 2 and may be secured thereto by screw threads, as shown at 25. A stationary tubular member 26 is fixed centrally within the member 23 and extends through an opening 27 in the outer end wall of the cylinder 22. The member 26 has an enlarged head 28 which is disposed within the cylinder 22 to serve as a limiting stop for the piston assembly of the secondary compressor against the force of the spring 21 and also may, if desired, act as a piston within the movable cylinder 22. Passages 29 are provided through the walls of the member 26 to establish communication between the bore of the member 26 and the annular space thereabout. An internally threaded discharge orifice 31 is provided at the outer end of the elongated portion 23 of the cap 24. The orifice 31 communicates, through the medium of passages 32, with the annular space about the tubular member 26 and with the bore of that member. It is intended that the discharge orifice 31 be coupled to a lubricant discharge nozzle, such as that indicated at 35, through a conduit such as the hose 36, as shown in the drawings, though, if desired, it may be connected rigidly to the nozzle.

In order that lubricant from the primary compressor may normally pass through the secondary compressor to the discharge nozzle 35, under pressures less than that required to compress the restraining spring 21, and be prevented from passing in the opposite direction, a check valve 38 is provided between the rearward side of the piston E and the cylinder 22. This arrangement permits relatively large quantities of lubricant, from between the pistons A and E, to be fed under low pressure applied by the piston A, through the secondary compressor and the nozzle 35.

I have provided in the lubricant feeding apparatus of Figs. 1 and 2, in compact unit assembly, means for normally delivering large quantities of lubricant through the nozzle 35 at relatively low pressures and which, when resistance above a predetermined degree is encountered, may automatically operate to deliver lubricant under increased pressure in relatively small quantities until such time as the resistance to lubricant flow through the fitting or bearing with which the fitting is associated is overcome, and wherein, during the latter function, the lubricant between the pistons A and E may move, en masse, in a piston-like manner within the barrel 2, without necessitating the flow thereof through a conduit, hose or any constricted passageway. This advantage is one of the primary objects of my invention and completely circumvents one of the most serious disadvantages attendant to apparatus wherein the primary and secondary compressors are independently confined and communicate with one another through a hose, conduit or interconnecting passage.

During the pressure stroke of the primary compressor, it is intended that the device be supported in the hand of the operator by manual grip upon the handle members 9 and 10, to cause the members to move toward one another so that the threads 12 may engage with the screw 4. Rotation of the hand grip 5 will then cause the screw 4 to move longitudinally to propel the piston A within the barrel 2. Assuming that the resistance to lubricant flow through the fitting, conduit or other member into which lubricant from the device is to be discharged, requires lubricant pressure greater than that which may be developed between the pistons A and E without causing the restraining spring 21 to yield, the piston E will be moved forwardly against the pressure of the spring to cause the members 22 and 26 of the high pressure or secondary compressor to telescope, and thus force lubricant through the nozzle 35 at greatly increased pressure, to overcome the increased resistance encountered. As the piston E is moved forwardly, the lubricant confined between the pistons E and A will move therewith as a body.

Assuming, further, that a second and possibly other succeeding pressure cycles of the secondary compressor are necessary to satisfy the requirements for proper lubrication of the parts to which the nozzle 35 is applied, it is obvious that the piston E must be returned with its associated elements to its normal retracted position by the spring 21, before each succeeding pressure stroke. It will be apparent that the piston E can not return to its retracted position until the piston A has also moved rearwardly an equal distance less that amount determined by the egress of lubricant from between the pistons A and E through the check valve 38 into the high pressure chamber of the secondary compressor. I have provided for this purpose, in the mechanism B, means for quickly allowing spring 21 to return the pistons E and A to their normal positions and permitting retracting the piston A by direct rearward pull upon the hand grip 5, if desired, at such times as when the handle members 9 and 10 are manually released to cause the spring 13 to move the members apart, and thus disengage the screw 4 from the threaded portions 12 of the handle members. This precludes the necessity of rotating the screw 4 in a reverse direction with consequent loss of time and wasted manual effort and makes for easy filling of the cylinder 2 with lubricant.

In Fig. 3, I have illustrated modified forms of certain of the parts of the apparatus of Figs. 1 and 2. The piston A is formed with a single cup leather seal 3 and mounted upon a piston rod 41 which slides freely through an opening 42 in the barrel cap 6, so that the piston may be thrust forwardly or pulled rearwardly by the application of direct right line manual force. A spider 43 is secured within the barrel 2, merely by friction, if so desired, and has a forwardly extending annular portion 44 which serves as a stop to limit rearward movement of the piston E, thus doing away with the necessity of incorporating the stop in the structure of the elements 26 and 22, as shown in Fig. 1. This form of the lubricant feeding device, while not practical for very high pressure application, is convenient to use for most purposes where a hand lubricant gun comparable to the commonly known screw actuated single piston compressor may be used.

In Fig. 4, a modification of the secondary compressor structure is illustrated wherein the cylinder 22 is telescopically mounted over a tubular plunger 45—46, fixed to the member 23, to form a lubricant tight seal between the enlarged head 46, formed at the rearward end of the plunger and the inner walls of the cylinder 22. The head 46 cooperates with the inwardly extending portion of the adjacent end wall of the cylinder about the opening 27 to form a limit stop for the retractile movement of the cylinder 22 under influence of the spring 21. The bore of the plunger 45—46 communicates with the discharge orifice 31. A slot 48 is provided through the side wall of the member 23 to permit escape of any lubricant that may leak between the plunger 46 and cylinder 22 and to enable the operator to observe, at all times, the exact position of the high pressure cylinder 22 of the secondary compressor.

In Fig. 5, I have illustrated a further modification of the structure of Fig. 4 wherein the apertured end wall of the cylinder 22 is omitted and the plunger 45—46 is formed with unbroken side walls which contact with the inner walls of the cylinder 22, to form a lubricant tight seal therebetween. A stud screw 49 is fixed to the outer wall of the cylinder 22 and located within the slot 48, to act as a limit stop for the cylinder 22 as it is urged rearwardly under influence of the spring 21. This construction is of comparatively simple form and may therefore be manufactured at low cost.

In Figs. 6 and 7, another form of the lubricant feeder apparatus is illustrated, wherein the lubricant may be introduced in cartridge form and wherein the mechanism B is so constructed as to permit the step by step advance or retractile movement of the primary compressor piston.

As in the case of the forms of apparatus heretofore described, the primary compressor and the secondary compressor are disposed within a common barrel 2 and have their pistons operable along a common axis. The pressure producing mechanism of the secondary compressor includes a tubular plunger 51 having an enlarged head 52 at the outer end, forming a piston located within the cylindrical elongated portion 23 of the cap 24. A spring pressed check valve 53 is located within the enlarged portion 52 of the plunger to permit the passage of lubricant through the plunger to that space ahead of the piston and to prevent the return flow of lubricant therethrough. The plunger 51 is secured to the operating piston E as by threaded engagement 54, and is held yieldingly in its retracted position by the spring 21. The actuating piston E differs in structure from its counter parts as illustrated in Figs. 1 and 3, in that no packing is employed and the piston is purposely constructed so as to clear the inner walls of the barrel 2. The piston E may be constructed of a casting in the form of a circular plate 55 having a rearwardly extending projection 56, provided with a conical outer side wall 57 forming a seat for the concave conical surface 58 of the discharge orifice wall of a cartridge 59, within which lubricant forming the source of lubricant supply is confined. The cartridge 59 is constructed to slide freely within the barrel 2 and may be disposed within the barrel upon the removal of the cap 24 or the cap 6 forming end closures for the barrel. The cartridge further includes a piston 61 which may also serve as one end closure for the cartridge as during shipment and handling.

The piston A of the primary compressor, operable through the mechanism B, differs also from the pistons A of Figs. 1 and 3 in that no packing means is employed. It may be constructed of a stamped metal plate 62, of lesser diameter than the piston 61 of the cartridge. A ratchet bar 63, having teeth 64 along one edge, is secured to the plate 62 and is intended to cooperate with the mechanism B to advance or permit return of the piston A step by step. The ratchet bar 63 is slidably mounted within an elongated extension 65 of the cap 6. With the mechanism B in one of its operative positions, the piston A may be manually moved freely along its axis by means of a hand grip button 66, secured at the rearmost end of the ratchet bar.

The mechanism B, in this form of the compressor, is of the general type employed in automobile wheel jacks, but modified to meet the particular requirements of my improved feeder apparatus. It comprises, in general, a fixed hand grip 71, a pivotally mounted operating lever 72, an operating pawl 73 pivotally mounted upon the lever 72 and engageable with the teeth 64 of the ratchet bar 63, a locking pawl 74 and a control lever 75 pivotally mounted upon the pivot stud 76 of the lever 72. A compression spring 77 serves to hold the lever 72 yieldingly away from the hand grip 71, as illustrated in Figs. 6 and 7.

In Fig. 6, the control lever 75 is shown as thrown rearwardly and held there by the snap compression of a spring 78, associated with the lever 75 by toggle arrangement. While in this position the lever 75 performs no function. Upon manually grasping the members 71 and 72 and closing the grip, the lever member 72 will swing about its center 76 to advance the pawl 73 so as to advance the ratchet bar 61 one tooth ahead, whereupon the locking pawl 74 will engage the next tooth of the ratchet bar and hold the bar against return or rearward movement. This operation may be repeated to advance the piston A as desired.

In Fig. 7, I have shown the control lever 75 set in its operative position, as for the retraction of the piston A, and it will be assumed that the piston A has been advanced and that the positions of parts are such that the secondary compressor spring 21 is partially or wholly compressed. The pawl 74 will restrain the ratchet bar 63 firmly because of its angular relation with respect to the ratchet teeth 64, which may be slightly undercut if desired, and therefore the spring 79 for the pawl 76 may be relatively light. A lateral extension 81 is formed on one side of the pawl 74 intersecting the plane of the lever 75. A similar extension 82 is formed on the pawl 73 which pawl, as in the case of the pawl 74, has a relatively light spring 83 urging it toward the ratchet bar 63.

With the lever 72 in the position shown in Fig. 7 and restrained by the stop 85, and the ratchet bar held by the pawl 74, the pawl 73 is swung clear of the ratchet bar by engagement of a forwardly protruding portion 86 of the lever 75 therewith. If the lever 72 is now drawn toward the grip 71, the extension 82 of the pawl 73 will disengage the portion 86 of the lever 75 and move up into the cut-away portion 87 of the lever 75. This action will allow the pawl to engage the ratchet bar, and as finger 88 formed on the lever 75 rests upon the extension 81 of the pawl 74, further movement of the lever 72 toward the grip 71 will cause the ratchet bar to be moved forwardly, through the pawl 73, so that the teeth 64 will no longer hold the pawl 74, and the spring 78 may then cause the finger 88 to move the pawl 74, against its spring 79, clear of the ratchet bar 63, which will then be held against retractile movement only by the pawl 73 operated by the lever 72. As the manual grip of the lever 72 is now released, the pawl 73 will move rearwardly: and, since the spring 21 of the secondary compressor is compressed to urge the ratchet bar 63 rearwardly, the pawl 73 will be held in engagement with the ratchet teeth 64 because of its angular relation to, or the undercut formation of, the teeth. As the lever 72 continues to move about the center 76, with pawl 73 held in engagement with the teeth by the pressure of spring 21, 82 will engage 86 and the finger 88 of the lever 75 will be raised and allow the pawl 74 to become again engaged with the ratchet bar, as shown. Further movement of the lever 72, under influence of the spring 77, will move the pawl 73 so that the extension 82 on the pawl may contact with the portion 86 of the lever 75 and become again disengaged from the ratchet bar 63.

I have, therefore, provided, in the mechanism B, force multiplying means for slowly moving the piston 62 of the primary compressor forwardly, with a step by step movement and, further, by adjustment of the control lever to the position shown in Fig. 7, the retraction of the piston 62 under the influence of the secondary compressor spring 21 with a step by step movement so long as the spring 21 is compressed to cause the pawl 73 to remain in engagement with the ratchet teeth 64 during the retractile movement of the piston. After the compressor spring 21 has returned the secondary compressor mechanism to its normal position, the teeth 64 will no longer function to retain either pawl in engagement therewith upon full movement of the lever 72 away from the grip 71; and, therefore, the piston 62 may be quickly operated by direct manual operation of the grip 66, when the lever 72 is moved as far as it will go away from the grip 71.

This form of lubricant feeding apparatus presents several advantages not heretofore provided in lubricant feeder apparatus, outstanding among which is the use of the cartridge 59 as an element common to the primary compressor and the secondary compressor. Incidental to this arrangement is the complete elimination of the packing for the piston A and the secondary actuating piston E due to the fact that the cartridge 59 with its combined end closure and piston 61 establishes the necessary lubricant tight relationship between the low or primary compressor and the secondary compressor pressure multiplying mechanism. In practice, this structure is of unusual importance as, with each new cartridge, a new piston 61 is provided thereby removing all possibilities of inefficiency and of lubricant losses due to continued wear upon the parts. A third and no less important advantage is gained in the provision of the source of lubricant supply in cartridge form since by this arrangement the lubricant may move, en masse, between the pistons A and E without touching the side walls of the barrel 2 and involving the friction between lubricant, sealing washers and barrel wall necessarily attendant therewith.

Under normal conditions, the secondary compressor will remain inoperative and relatively large qauntities of lubricant may be fed through the valve 53 of the secondary compressor and the discharge orifice 31 of the apparatus upon operation of the primary piston A including the cartridge piston element 61. When resistance to lubricant flow through the discharge orifice 31 is encountered in excess to that which requires pressure between the pistons A and E greater than that restrained by the spring 21, the entire cartridge will be shifted forwardly to operate the secondary compressor and develop high pressure within the cylinder formed by the member 23, to thus feed lubricant through the parts of increased resistance to lubricant flow. During this latter function, the piston A may be advanced step by step and likewise retracted, as described.

While I have shown, in combination, the cartridge feature in connection with a step by step piston operating mechanism B, it will be apparent that either feature may be embodied separately in any of the types of apparatus herein illustrated, and that the specific combination of Figs. 6 and 7 has been presented to illustrate modifications of the major elements severally.

In Fig. 8, I have shown a further form of the lubricating apparatus differing in general from the forms previously described in that the mechanism B for advancing the piston A includes a rack and pinion drive, and in the provision of locking mechanism for rendering the secondary compressor inoperative.

A rack 91 is secured, as by screws 92, directly to the piston A which includes a single cup leather 3 as shown. The rack 91 extends through a guide passage 93 formed centrally through the cap 6. The rack may be formed of either flat-sided or round stock with teeth 94 extending along one side. A hand grip 95 is fixed to the outer end of the rack so that the piston may be advanced by direct manual thrust or retracted by pulling rearwardly upon the hand grip 95. A pinion 96, mounted upon a shaft 97 extending transversely to the axis of the rack, is mounted upon the cap 6 with its teeth engaged with the teeth 94 of the rack. A hand wheel 98 is fixed to one end of the shaft so that the piston may be operated through the rack and pinion by manual operation of the hand wheel, to establish a force multiplying piston drive.

The secondary compressor includes a tubular plunger 101, slidably disposed within the cylindrical elongated portion 23 of the cap 24, and a spring pressed check valve, as shown at 102, disposed at the forward end of the tubular plunger to establish one-way communication between the lubricant space intermediate the pistons A and E and the high pressure cylinder of the secondary compressor, so that lubricant from the primary compressor may flow freely to the discharge orifice 31, but return flow is precluded.

It is contemplated that there will be many instances where the function of the secondary compressor is not needed but additional lubricant capacity is desirable. Contemplating this condition, I have provided a locking pin 103, mounted for longitudinal movement in a bore 104, disposed transversely to the axis of the plunger 101. The pin 103 has an annular groove 105 extending about its circumference, within which a retaining spring 106 may enter to lock the pin in that position shown in the drawings. The plunger 101 has a pair of annular grooves 107 and 108 formed adjacent to the forward and rearward ends thereof. These grooves are of sufficient width to receive the end of the pin 103 to lock the plunger against reciprocation, regardless of the pressure exerted upon the piston E.

The locking pin 103 may perform one or two functions. First, that of locking the secondary compressor with the piston E advanced forwardly of the barrel 2 against the force of the spring 21, thus greatly increasing the available lubricant space within the feeder apparatus for discharging lubricant under influence of the primary compressor. In the second instance, the pin 103 may remain in the position shown in Fig. 8 until such time as the operator observes the necessity for obtaining higher pressure, a condition which may usually be made known by the work required to advance the piston A. When such a demand is encountered, it is then only necessary to release the pin 103 and continue with the advance of the piston A so as to operate the secondary compressor in the manner heretofore described. After the secondary compressor has functioned to expel lubricant under relatively high pressure through the discharge orifice 31 and the plunger 101 has been moved to its extreme forward position as the result of such operation, the pin may be moved inwardly to engage with the groove 108 and thus lock the piston E in its advanced position, thereby obviating the necessity of retracting the piston A a considerable distance before removing the lubricant nozzle from the fitting or other device into which lubricant is to be discharged. The operator may then continue to use the feeder apparatus as a low pressure device through the function of the primary compressor or he may elect to draw the pin 103 and permit the secondary compressor to again assume its normal operative position, as shown in Fig. 8.

In Fig. 9, I have shown a modified form of the secondary compressor which may be applied to any of the types of apparatus illustrated and described herein. In this embodiment of the apparatus, the cylindrical portion 23 of the barrel cap 24 forms a pressure cylinder within which a tubular plunger 109 having a piston formed of an enlarged head 111 is disposed, one end of which is supported upon the piston E. A check valve 112 (shown in dotted lines) is disposed within the rearward end of the plunger 109 and functions precisely in the same manner as the check valve 102. Means for limiting the rearward movement of the piston E may comprise either a metal disc 113 interposed between the cap 24 and the barrel 2, through which the plunger 109 extends and which forms a stop against which the adjacent end of the piston 111 may engage, or a wire cable 114 secured at 115 to the piston E extended through an opening 116 in the cap 24 and provided with a ball 117 at its outer end. The cable 114 with the ball 117, when employed to limit the movement of the piston E, provides a visible indication of the position of the piston E so that the operator may observe at all times whether the secondary compressor is in its normal operative position or is performing its pressure multiplying function. The balance of the assembly includes a spring 118 having the function of the spring 21 but illustrated in this embodiment as having a cylindrical formation rather than a conical.

I have illustrated and described herein several forms of my improved lubricant feeder apparatus, all of which possess the generic features of a primary or low pressure compressor having a piston, a secondary or high pressure compressor having an actuating piston of the same diameter as that of the primary piston, and the disposition of the immediate lubricant supply source between the two opposed pistons, so that the lubricant may move en masse during the function of the secondary compressor under conditions involving minimum resistance. Among the advantages of this arrangement is the increase in efficiency of the feeder apparatus inasmuch as higher pressure may be developed with the same amount of manual effort as compared to that type of apparatus constituting the established art.

I have illustrated several modifications of the secondary compressor structure as well as several types of primary piston actuating mechanisms B. The latter all possess the generic feature of quick return of the primary piston so that no time need be wasted after the functioning of the secondary compressor, an advantage which is particularly appreciated where several successive high pressure cycles of the apparatus must be carried out to satisfy the servicing demand or where the lubricant is unusually heavy or cold.

I claim:

1. A lubricating device comprising, a primary compressor having a piston, a secondary compressor coupled to said primary compressor, said secondary compressor having an actuating piston operable under the influence of said primary compressor, and having the displacement of its actuating piston equal to that of said primary compressor piston, and means for advancing the piston of said primary compressor through a mechanical force differential and for quickly retracting said piston by direct pull, said means including a rack extending rearwardly of said primary piston and a manually operated pinion engageable with said rack.

2. A lubricant feeder apparatus comprising, a primary compressor including a piston, means for advancing said piston and for quickly retracting the piston, said means including a rack extending rearwardly of said primary piston and a manually operated pinion engageable with said rack, a secondary compressor operable by lubricant pressure from said primary piston including a pair of differential pistons the larger of which is of the same diameter as said primary piston, and a lubricant discharge nozzle communicating with the smaller of said differential pistons.

3. A lubricating device comprising, a primary compressor having a piston, a secondary compressor coupled to said primary compressor, said secondary compressor having an actuating piston operable under the influence of said primary compressor, and having the displacement of its actuating piston equal to that of said primary compressor piston, and means for advancing the piston of said primary compressor through a mechanical force differential and for quickly retracting said piston by direct pull, said means including a ratchet bar extending rearwardly of said primary piston, manually operable mechanism engageable with said ratchet bar and a control lever for disengaging said mechanism and said ratchet bar.

4. A lubricant feeder apparatus comprising, a primary compressor including a piston, means for advancing said piston and for quickly retracting the piston, said means including a ratchet bar extending rearwardly of said primary piston, manually operable mechanism engageable with said ratchet bar and a control lever for disengaging said mechanism and said ratchet bar, a secondary compressor operable by lubricant pressure from said primary piston including a pair of differential pistons the larger of which is of the same diameter as said primary piston, and a lubricant discharge nozzle communicating with the smaller of said differential pistons.

5. A lubricating device comprising, a primary compressor having a piston, a secondary compressor coupled to said primary compressor, said secondary compressor having an actuating piston operable under the influence of said primary compressor, and having the displacement of its actuating piston equal to that of said primary compressor piston, means for advancing the piston of said primary compressor through a mechanical force differential and for quickly retracting said piston by direct pull, and means for locking said secondary compressor piston assembly against return movement at will.

6. A lubricating device comprising, a primary compressor having a piston, a secondary compressor coupled to said primary compressor, said secondary compressor having an actuating piston operable under the influence of said primary compressor, and having the displacement of its actuating piston equal to that of said primary compressor piston, yieldable means for restraining said actuating piston, and means for locking said secondary compressor piston assembly in its retracted position or in its advanced position at will.

7. A lubricating device comprising, a casing, a lubricant cartridge located within said casing and free to move along the axis thereof, a primary compressor piston bearing upon the lubricant in said cartridge, means for advancing said piston against the lubricant within the cartridge, and a secondary compressor actuated by the movement of said cartridge within said casing and adapted to receive lubricant from within the cartridge and to discharge the said lubricant under relatively high pressure upon movement of the cartridge under the influence of said primary compressor piston.

8. A lubricating gun comprising, a barrel, a differential piston in the barrel adapted to be moved by the movement of lubricant contained in the barrel, pressure increasing means including the differential piston operable upon the movement of the lubricant in said barrel, a manually operable piston in said barrel for moving the lubricant therein, said manually operable piston having a piston packing operable to provide a lubricant-tight seal when the piston is moved in either direction, and quick retraction means for said last named piston.

9. A lubricating device comprising, a barrel adapted to receive an original lubricant package container for sliding movement therein, means tending to urge said container inwardly of the barrel for applying pressure to the lubricant in said container when the container is in said barrel, a high pressure pump unit associated with said barrel having an inlet communicating with the interior of said container, said high pressure pump being adapted to discharge lubricant upon bodily movement of said container under the influence of said pressure applying means, and means for returning said container to its original position in said barrel when pressure applied to the lubricant contents of the container is relieved.

10. In combination, a high pressure lubricant pump including a movable pump member, a lubricant cartridge having an outlet opening at one end and a piston forming a movable closure for the opposite end thereof, said cartridge being adapted to engage with said movable pump member and to establish lubricant communication between said cartridge outlet opening and said pump, means preventing the return flow of lubricant from said pump to said cartridge, and means for applying thrust to said cartridge piston in the direction of said cartridge outlet opening and along the path of movement of said movable pump member.

11. In combination, a barrel, a high pressure lubricant pump mounted on said barrel and having a movable pump member, a lubricant cartridge having an outlet opening at one end and a piston forming a movable closure for the opposite end thereof, said cartridge being adapted for sliding movement in said barrel and to engage with said movable pump member, means for establishing lubricant communication between said cartridge outlet opening and said pump, means preventing the return flow of lubricant from said pump to said cartridge, and means for applying thrust to said cartridge piston to move the same toward said outlet opening and along the path of movement of said movable pump member, said last named means including a manually operated thrust member mounted upon the barrel.

12. A lubricating device comprising a cylindrical reservoir, a high pressure cylinder secured to said reservoir, a plunger in said high pressure cylinder, a piston on said plunger in said reservoir, a second piston in said reservoir, there being a lubricant space between said pistons, a rod for actuating said second piston extending through one end of said reservoir, and means carried by the reservoir and cooperating with said rod to facilitate actuation thereof, said means including a handle extending laterally from the reservoir.

13. A lubricating device comprising a cylindrical reservoir, a high pressure cylinder secured to said reservoir, a plunger in said high pressure cylinder, a piston on said plunger in said reservoir, a second piston in said reservoir, there being a lubricant space between said pistons, a rod for actuating said second piston extending through one end of said reservoir, means carried by the reservoir and cooperating with said rod to facilitate actuation thereof, said means including a handle extending laterally from the reservoir, and a member operable by said handle to engage the rod.

JOHN L. CREVELING.